US011418319B2

(12) United States Patent
Aharoni et al.

(10) Patent No.: US 11,418,319 B2
(45) Date of Patent: Aug. 16, 2022

(54) ENSURE VALID RANGE OF VALUES OF A VECTOR FOR DISTANCE CALCULATIONS USING HOMOMORPHIC ENCRYPTION OR FUNCTIONAL ENCRYPTION

(71) Applicant: International Business Machines Corporation, Armonk, NY (US)

(72) Inventors: Ehud Aharoni, Kfar Saba (IL); Allon Adir, Kiryat Tivon (IL); Lev Greenberg, Haifa (IL); Omri Soceanu, Haifa (IL); Ariel Farkash, Shimshit (IL)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 16/862,612

(22) Filed: Apr. 30, 2020

(65) Prior Publication Data

US 2021/0344477 A1 Nov. 4, 2021

(51) Int. Cl.
*H04L 9/00* (2022.01)
*H04L 9/32* (2006.01)

(52) U.S. Cl.
CPC ............ *H04L 9/008* (2013.01); *H04L 9/3231* (2013.01)

(58) Field of Classification Search
CPC .............................. H04L 9/008; H04L 9/3231
See application file for complete search history.

(56) References Cited

U.S. PATENT DOCUMENTS

| | | | | |
|---|---|---|---|---|
| 9,374,370 | B1 * | 6/2016 | Bent, II | H04W 12/068 |
| 2014/0281946 | A1 * | 9/2014 | Avni | G06V 40/388 726/4 |
| 2019/0140818 | A1 | 5/2019 | Bent | |
| 2020/0228340 | A1 * | 7/2020 | Blackhurst | H04L 9/3231 |

FOREIGN PATENT DOCUMENTS

| | | | |
|---|---|---|---|
| KR | 101755995 | B1 | 7/2017 |
| KR | 102008101 | B1 | 8/2019 |

OTHER PUBLICATIONS

Gomez-Barrero et al., Multi-Biometric Template Protection Based on Homomorphic Encryption, in Journal-Pattern Recognition, vol. 67 Issue C, Jul. 2017.

Abdalla et al., Simple Functional Encryption Schemes for Inner Products, in IACR International Workshop on Public Key Cryptography, Apr. 1, 2015.

* cited by examiner

*Primary Examiner* — Farid Homayounmehr
*Assistant Examiner* — Brian William Avery
(74) *Attorney, Agent, or Firm* — Gregory J Kirsch

(57) ABSTRACT

Embodiments may provide distance computations on homomorphic and/or functional encrypted vectors while detecting whether the resulting distance has wrapped around due to the vectors having elements not in an allowed range. A method of user authentication processing may comprise receiving and storing enrollment information from a client computer system, the enrollment information comprising a template of authentication data and at least one additional encrypted vector, receiving an additional template to be used (Continued)

to authenticate the user from the client computer system, authenticating the user using the received additional template using the stored template and the stored at least one additional encrypted vector, and determining that authentication is successful when the received additional template matches the stored template and is valid based on the stored at least one additional encrypted vector.

6 Claims, 3 Drawing Sheets

ENSURE VALID RANGE OF VALUES OF A VECTOR FOR DISTANCE CALCULATIONS USING HOMOMORPHIC ENCRYPTION OR FUNCTIONAL ENCRYPTION

BACKGROUND

The present invention relates to techniques that provide distance computations on homomorphic and/or functional encrypted vectors while detecting whether the resulting distance has wrapped around due to the vectors having elements not in an allowed range.

Homomorphic Encryption (HE) is an encryption technology that allows performing a function on ciphertexts to generate an encrypted result which, when decrypted, matches the result of the operations as if they had been performed on the plaintext.

For example, if C1 is the encryption of T1, and C2 the encryption of T2, then some function f may exist such that C3=f(C1,C2) is the encryption of T1+T2 (arithmetic sum). A similar function may exist for multiplication and other operations. If T1 and T2 are vectors, then there may exist a function g such that C3=g(C1,C2) is the encryption of the Euclidean distance between T1 and T2. A fully homomorphic encryption scheme allows computing any function on the plaintexts through operations of the ciphertexts.

Another type of encryption, called Functional Encryption (FE), allows the computation of a function on ciphertexts C1 and C2, which will produce in the same result as the application of a function on the corresponding plaintexts T1 and T2. For example, an FE system may include a function f, such that f(C1,C2) is equal to the Euclidean distance between T1 and T2. One difference from HE is that in applying functional encryption, the result of the calculation is received in the clear, that is, not encrypted.

Both methods can be used, for example, for Biometric authentication on a server (for example, in the cloud), for preserving privacy. Typically, biometric authentication on a server may be done as follows: When a user enrolls (signs-up), their client device may compute a biometric template T1 that identifies them, and then submit T1 to the server. The server keeps all biometric templates of all users. When users later authenticate (sign-in), their client device may compute a new biometric template T2, and send it to the server. The server computes the distance between T1 and T2 according to some distance metric, and authenticates the user if the templates are close enough.

In a privacy preserving biometric authentication scheme, FE or HE systems are used so that the users can provide the templates in encrypted form. They'll keep the private key secret, so the server will never be able to decipher the biometric data itself. But thanks to the FE/HE properties, the server will be able to compute the distance between T1 and T2 needed for authentication. If HE is used, then the computed distance is still encrypted. The server can have the client decrypt it without revealing information to the client by some form of Zero Knowledge proof (for example, the server can further manipulate the encrypted distance to mask the true distance).

A vulnerability of such a scheme is when a malicious user tries to illegally authenticate as a different user, by sending an illegal cipher text C*. While the known FE and HE systems provide various security guarantees, these guarantees assume proper usage of the encryption algorithm. If the ciphertext C* was computed by an encryption algorithm that was tampered with, most of the guarantees may be void.

Commonly used cryptosystems may be based on a ring $Z_p$ for some prime p, meaning the ciphertext is an encryption of a vector of numbers in the range 0, 1, . . . , p−1. Also, it means that cryptosystems that allow to perform operations on the plaintexts through operations on the ciphertexts, the operations are done using modular arithmetic, i.e., as operations over the ring $Z_p$. The value of p is usually very large (for example, over 5 million), whereas the biometric system may require the vectors to be in some smaller range, such as [0,100). Setting p to a small value closer to the required range may be impossible for several reasons:

The cryptosystem may have a built-in value for p that cannot be changed. For example, the some well-known functional encryption libraries may have a limited number of unchangeable preset values for p, with extremely large values.

The cryptosystem should accommodate computations over the input vectors. For example, when computing the squared Euclidean distance between two input vectors of length 128 over the range [0,100), the result may be in the range [0,1280000), hence p should be set to at least 1280000 in order for this computation to succeed.

A malicious client may create a ciphertext C* that is illegal in the sense that it contains values outside the range prescribed by the underlying biometric system. The malicious client may actually benefit from this. It may choose large illegal values deliberately, causing the distance computation on the server to result in values larger than p. Computations performed on the ring $Z_p$ will cause the values to wrap around and start over at 0, hence the server may end up with a final result close to 0. For example, if the distance between T1 and T2 is p+10, when the server computes this distance using HE or FE the computation will wrap around and the result will be 10, since it will compute the distance in $Z_p$. It can be shown that this type of attack may increase the probability of success to a value higher than the normal false positive rate of the biometric system.

Accordingly, a need arises for techniques that provide, for example, distance computations on homomorphic and/or functional encrypted vectors while detecting whether the encrypted vectors contain values outside the range prescribed by the biometric system. Note that such a technique is required only for the case where the resulting distance is small enough to be considered a successful authentication. In cases where the resulting distance is large, the authentication process fails anyway, therefore detecting whether the encrypted template is illegal or not is less important.

SUMMARY

Embodiments may include techniques that provide, for example, distance computations on homomorphic and/or functional encrypted vectors while detecting whether the resulting distance has wrapped around due to the vectors having elements not in an allowed range.

For example, in an embodiment, a method of user authentication processing may be implemented in a computer system comprising a processor, memory accessible by the processor, and computer program instructions stored in the memory and executable by the processor, the method comprising: receiving and storing enrollment information from a client computer system, the enrollment information comprising a template of authentication data and at least one additional encrypted vector, receiving an additional template to be used to authenticate the user from the client computer system, authenticating the user using the received additional template using the stored template and the stored at least one additional encrypted vector, and determining that authentication is successful when the received additional template matches the stored template and is valid based on the stored at least one additional encrypted vector.

In embodiments, the template of authentication data and the received additional template may be vectors representing values of features of biometric data and the at least one additional encrypted vector may be a random 0-1 vector. The stored template may be encrypted and determining that the received additional data matches the stored template comprises computing a distance function between the stored template and the received additional template, for example a squared Euclidean distance, where the computation is done using modular arithmetic, and determining that they match when the computed distance is smaller than threshold. Determining that the received additional template is valid may be based on the stored at least one additional encrypted vector using an inner product between received additional template and the stored at least one additional encrypted vector and testing whether a result is confined to a range. The number of additional encrypted vectors chosen during enrollment may be selected based on desired probability of detecting invalid/malicious template. The encryption may be Homomorphic Encryption or Functional Encryption.

In an embodiment, a system for user authentication processing may comprise a processor, memory accessible by the processor, and computer program instructions stored in the memory and executable by the processor, the method comprising: receiving and storing enrollment information from a client computer system, the enrollment information comprising a template of authentication data and at least one additional encrypted vector, receiving an additional template to be used to authenticate the user from the client computer system, authenticating the user using the received additional template using the stored template and the stored at least one additional encrypted vector, and determining that authentication is successful when the received additional template matches the stored template and is valid based on the stored at least one additional encrypted vector.

In an embodiment, a computer program product for user authentication processing may comprise a processor, memory accessible by the processor, and computer program instructions stored in the memory and executable by the processor, the method comprising: receiving and storing enrollment information from a client computer system, the enrollment information comprising a template of authentication data and at least one additional encrypted vector, receiving an additional template to be used to authenticate the user from the client computer system, authenticating the user using the received additional template using the stored template and the stored at least one additional encrypted vector, and determining that authentication is successful when the received additional template matches the stored template and is valid based on the stored at least one additional encrypted vector.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include techniques that provide, for example, distance computations on homomorphic and/or functional encrypted vectors while detecting whether the resulting distance has wrapped around due to the vectors having elements not in an allowed range.

Figure 1:
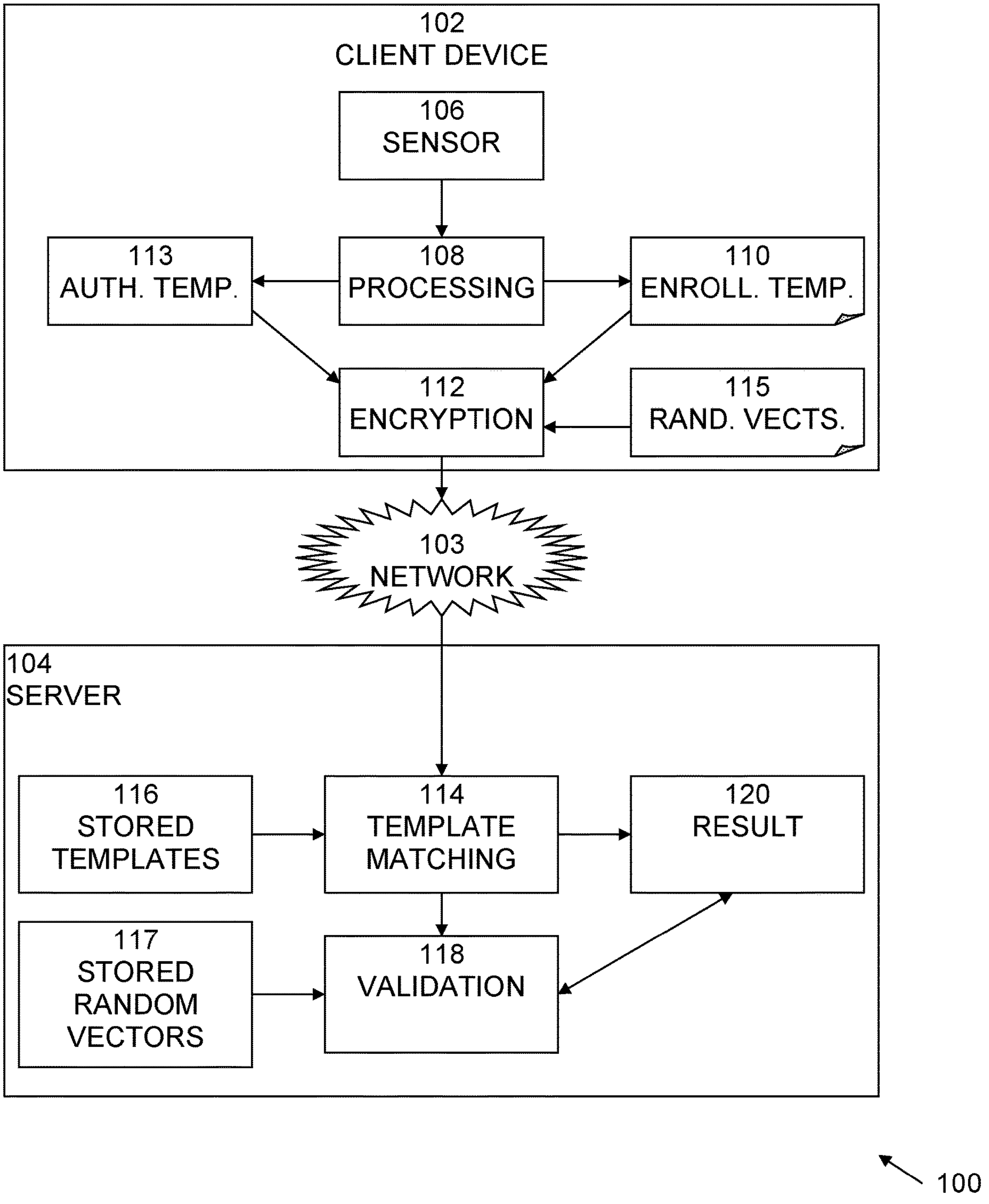
FIG. 1 is an exemplary block diagram of a biometric enrollment and authentication system according to embodiments of the present techniques.

An exemplary block diagram of a biometric enrollment and authentication system 100 is shown in FIG. 1. In this example, system 100 may include a client device 102, network 103, and a server 104. Client device 102 may include biometric sensor 106, processing block 108, enrollment template 110, encryption block 112, authentication template 113, and random vectors 115. Biometric sensor 106 is the interface between the real world and the system and may acquire all the needed biometric data. Examples of such biometric sensors may include physiological trait sensors, such as fingerprint readers, iris scanners, face scanners, palm print scanners, hand vein scanners, finger geometry scanners, ear geometry scanners, retinal scanners, tooth shape scanners, behavioral trait sensors, such as signature capture devices or scanners, walking gait detection scanners, voice capture devices, keystroke capture devices or apps, etc. Such sensors may include visual capture devices, such as cameras, audio capture devices, such as microphones, etc., along with associated circuitry.

Processing block 108 may include one or more processing devices, such as processors, CPUs, GPUs, etc. Processing block 108 may perform pre-processing, such as removing artifacts from the sensor signal or data, enhancing the input, such as removing background noise, data normalization, etc. Further, Processing block 108 may perform extraction of features from the pre-processed signal or data to generate a template 110, 113. Template 110, 113 typically includes a vector of features, for example, represented as numbers indicating the value of each feature. A template may be a synthesis of the relevant characteristics extracted from the sensor signal or data. For example, the raw form of biometric information may be processed to form a template, which may be a vector containing values representing features of the biometric information. Encryption block 112, which may be implemented in processing block 108, or may be implemented separately, may encrypt template 110, 113 before transmission to server 104. Random vectors 115 may be vectors containing only zeros and ones, each drawn independently from a uniform distribution over zero and one. Encryption block 112 may encrypt random vectors 115 before transmission to server 104.

Server 104 may include a template matching block 114, a plurality of stored templates and random vectors 116, and a validation block 118. In embodiments, stored templates 116 and random vectors 117 may include one or more enrollment templates 110 and a plurality of random vectors 115 received from client device 102. In embodiments, when template 113, which may be encrypted, is received from client device 102, matching block 114 may retrieve a stored template 116 and attempt to match it with the received template 113, both of which may be encrypted using, for example, FE or HE. If matching block 114 determines that stored template 116 matches received template 113, then validation block may attempt to validate received template 113 using stored random vectors 117. In this case, embodiments may use FE or HE to encrypt the templates, as these forms of encryption allow the matching and validation processes to be performed directly on the encrypted templates. If FE is used, the matching and validation processes results will be available to the server directly. If HE is used, the matching and validation process results will be encrypted, and the server can send them to the client to decrypt them and send back to the server. If the server wants to hide these results from the client, it can first use HE operations to mask them, or use some form of zero knowledge proof.

In embodiments, server 104 may use a matching process, in which, for example, template 110 may be compared to a stored template 116 by determining a measure of the distance between the two templates (vectors). If the distance is small enough, the two templates may be determined to match. The measures of the distance between the two templates may be determined, for example, by calculating the squared Euclidean distance over FE or HE encrypted vectors for purposes such as Biometric authentication. For example, client device 102 may compute templates that are vectors of n integers in the range [−a,a] for some given constant a. The constant a is chosen to accommodate the range of legal values for a biometric template. If the biometric system produces real numbers (not integers), for example in the range [−1,1], they can be transformed to integer range [−a,a] by multiplying by a and rounding. The choice of a determines precision in this case. In embodiments, the cryptosystem is over the ring $Z_p$ for some very large prime p (note that a negative number x is represented as p+x in $Z_p$). This means that the plaintext being encrypted are numbers in $Z_p$, while the computations performed over this system are performed using modular arithmetic with modulus p, or over the ring $Z_p$.

In embodiments, p may be large enough such that Euclidean distance squared between two legal vectors is less than p, for example, $4na^2<p$. Embodiments may also utilize an even more strict requirement for p, as described below. Therefore, computing the Euclidean distance between two legal vectors over $Z_p$ will contain the correct results. However, if a vector contains one or more illegal values outside the range [−a,a], the Euclidean distance between the illegal vector and a legal vector might be larger than or equal to p, and therefore, when computing the distance in $Z_p$, the result may wrap around and yield a result with a substantially smaller number.

In embodiments, matching process 114 may detect whether the resulting distance has wrapped around due to the vectors having elements not in the range [−a,a] using the validation process 118. During an enrollment process at which the client is trusted, the client may submit one or more encrypted random vectors, each of length n, such as Each vector element is in range 0-1, independently and randomly chosen from a uniform distribution over 0-1. Later, in the user authentication step, when the client submits an encrypted template x that is suspected to contain illegal values, matching process 114, if it found the new template matches the old template, may run the validation process 118. The validation process determines if the result of the inner product between template x and each of the one or more stored random vectors $v^1, v^2 \ldots, v^m$ is confined to the range [−na,na], i.e., For each i=1 m, $<v^i,x>\in[-na,na]$, where $<v^i,x>$ denotes the inner product between $v^i$ and x. If for any i (ranging from 1 to m) this test fails, then validation process 118 failed, and the matching process 114 can be sure that the input vector x is illegal.

Otherwise, if the validation process 118 passes, it is likely that Euclidean distance computations between x and a legal encrypted vector over $Z_p$ will be accurate. For example, it can be proven that if x's distance from a legitimate vector wraps around resulting with a small number that indicates a match, then the validation process 118 will pass (i.e., will not detect the wrap around) with a small probability, 0.5', where m=number of random vectors sent by client device 102. This result relies on the assumption that $p>n(2na+a)^2$, which holds for commonly used cryptosystems where p is extremely large for cryptographic reasons.

Figure 2:
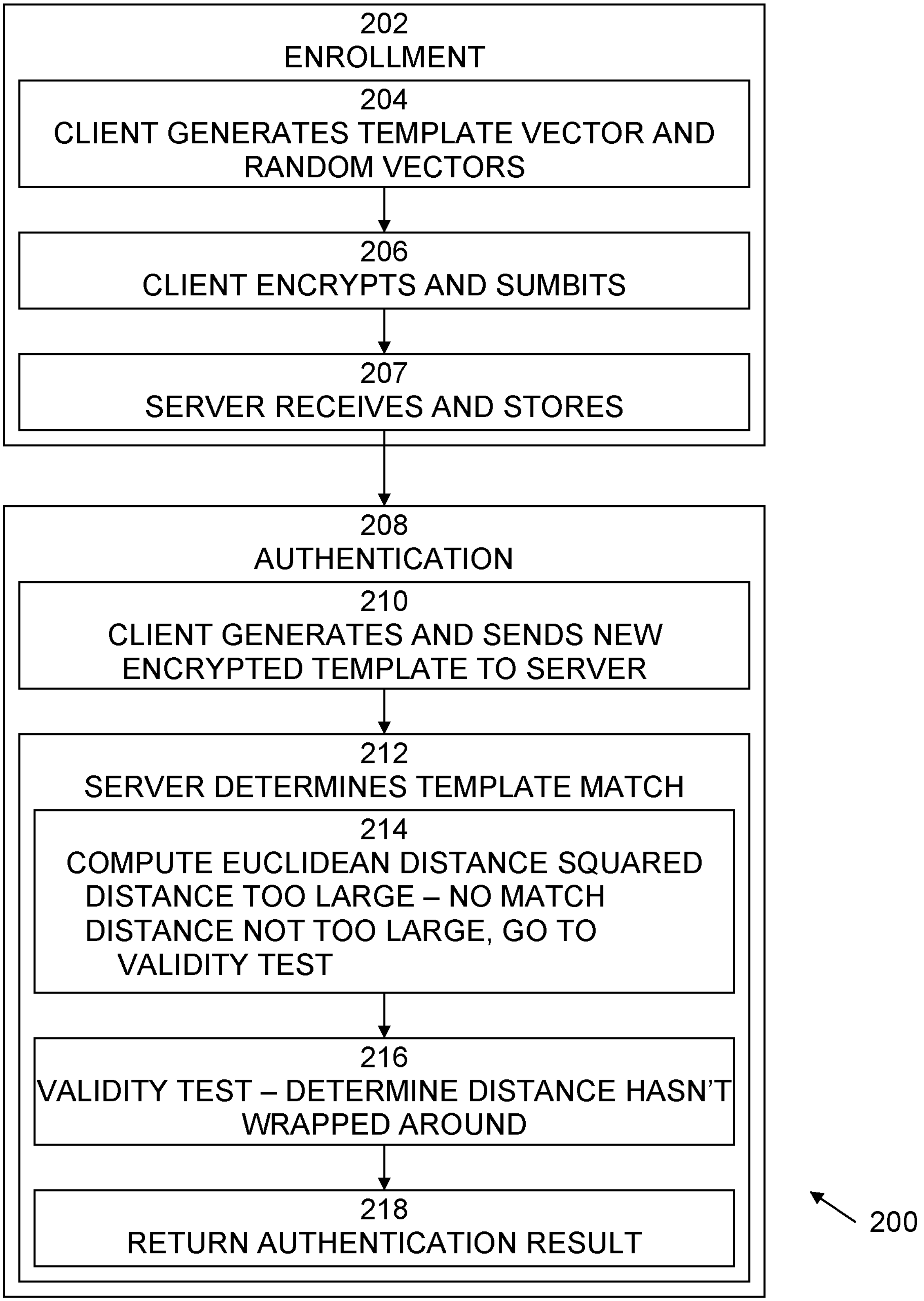
FIG. 2 is an exemplary flow diagram of a process of operation of the exemplary biometric authentication system according to embodiments of the present techniques.

An exemplary flow diagram of a process of user enrollment and authentication according to the present techniques is shown in FIG. 2. It is best viewed in conjunction with FIG. 1. Process 200 begins with 202, an enrollment process of client device 102. Enrollment process 204 may begin with 204, in which, client device 102 may compute 108 a template vector 110 based on biometric information. It may be a vector o of dimension n, with integer values in the range [−a,a], that is each element $o_i$ may be an integer in the interval [−a,a]. It is assumed that $p>n(2na+a)^2$. The value a is a property of the underlying biometric authentication method—different systems may utilize different ranges of a. In embodiments, biometric systems may produce templates with real numbers, not integers, but these real numbers may be transformed to integers in some range. The 'a' value therefore depends on the biometric system and the desired accuracy. Typical values may be, for example, a=100, or a=1000. The client may also compute m>=1 (one or more) random vectors 115, each of dimension n (the same dimensions as the template). Each element in each vector may be either 0, or 1, drawn randomly, uniformly, and independent and identically distributed.

At 206, client device 102 may generate the required public key and private key for either FE and HE, and encrypt 112 the enrollment template vector 110 and the random vectors 115. Client device 102 may send to server 104 the encrypted vectors (template 110+m random vectors 115)+ additional information required for the server to do the distance computations. For example, HE may require sending over the public key, and FE schemes usually require sending some public parameters as well. In either case, client device 102 doesn't send the private key, or any other information that can allow the server to decrypt the data. In addition, the client 102 may send some identification information, for example a user name. At 207, server 104 may store 116 the received template 110 and may store 117 the associated random vectors 115 together with the additional information, including for example the public key and user name.

At 208, client 102 and server 104 may perform user authentication. Authentication 208 may begin with 210, in which a user may use client device 102 to acquire a new biometric measurement using sensor 106 and compute authorization template 108, which is a new biometric template vector t of length n. Client device 102 may encrypt 112 template vector t 108 using, for example HE or FE, and using, for example, the same set of keys used during enrollment, and may then send encrypted template vector t to server 104, in addition to identification information, for example, a user name. Each element $t_i$ of the template vector t should be in the range [−a,a], however, a malicious user might send values from the entire range [0,p−1] allowed by the cryptosystem. For example, they may send values outside the legal range [−a,a].

At 212, server 104 may retrieve the stored received templates and associated m random vectors 116 based on user identification, for example a user name. and may determine whether received encrypted template vector t matches 114 a stored template 116. In order to determine a match, at 214, server 104 may compute a Euclidean distance squared between received encrypted template vector t and a stored template o 116. For example, such a Euclidean distance squared may be denoted as: $\|t-o\|^2$. Matching process 214 will decide if the template matches if the result is below T. Thus, the distance between the vectors is not too large if and only if the Euclidean distance between t and o is at most sqrt(T). Server 104 may be able perform this computation thanks to properties of the FE or HE, which allow such computations. For HE, another communication round with client 102 is needed for decrypting the results, not shown in the figure. However, these encryption schemes dictate this computation be done over modular arithmetic with modulus p. Hence, it might happen that a large distance result will wrap around and end up appearing to be a small distance. At 214, if the distance result is too large, that is, above some pre-defined threshold it means the authentication has failed for sure, and the process goes to 218, in which server 104 may return the result of the authentication (failure in this case) according to the usual protocols of authentication servers.

At 214, if the distance result is not too large, that is, below the threshold, then at 216, a validity test may be performed. In the validity test, server 104 may compute the inner product between received encrypted template vector t and each of the stored m random vectors 116 sent during enrollment and requiring for example all results to be within a confined range, for example [−na,na]. Denoting one of these random vectors by v, and its elements by $v_i$, and the elements of t by $t_i$, the validation test fort and v amounts to, for example, $\Sigma t_i\ v_i \pmod p \in [-na,na]$. And this test is repeated for all random vectors. This test may be done thanks to the properties of FE and HE which allows such computations. For HE, another communication round with client 102 is needed for decrypting the results, not shown in the figure. The validity test may pass if all the results are in the range [−na,na]. If the validity test passes, the user is authenticated, otherwise the authentication has failed. At 218, server 104 may return the result of the authentication (success or failure) according to the usual protocols of authentication servers. For example, server 104 may notify the user, or other systems that need to be notified, and if the authentication passes provide them with a token that will allow the user access to the required system(s).

Note that described is a process where the user enrolls and authenticates with a single template, but it will be clear to one of ordinary skill in the art how to extend this to multiple templates both during enrollment and authentication. The validation process can be repeated for each template, with the same random vectors, or a separate set of random vectors for each template.

A mathematical proof that the above described process works is presented below.

For the proof the following Notation may be used: The elements of $Z_p$ may be represented using integers in the range (−p/2,p/2) instead of [0,p−1], a representation well known in the art. For example, $Z_7$ may be represented using the set {−3,−2,−1,0,1,2,3} instead of {0,1,2,3,4,5,6}. All the numeric variables used are assumed to be integer elements in Z. For $a \in Z$, a (mod p) may indicate conversion to the range (−p/2,p/2) via modular congruence. For example, 5 (mod 7)=−2. For two members $a,b \in Z$ a distance function may be defined as follows: $d_p(a,b)=|(a-b) \pmod p|$. Intuitively, the integer number line is coiled to a circle with period p, then d(a,b) measures the distance between a and b along the shorter arc. For example, for p=7 it holds that $d_7(-1,2)=3$, $d_7(1,-1)=2$, and $d_7(-3,3)=1$.

We assume t is a template vector received at the server during the authentication process, and o is a template vector received during the enrollment, and v a random vector received during enrollment. We'll denote specific elements of these vectors by $t_i$, $o_i$, and $v_i$ respectively.

A Proximity Test may be defined as: $\Sigma(t_i-o_i)^2 \le T$.

Thus, the proximity test passes if and only if the Euclidean distance between t and o is at most sqrt(T).

However, the encryption scheme may limit the techniques to performing the following similar test 212:

A proximity test using modular arithmetic, which we term A Modular Proximity Test may be defined as: $\Sigma(t_i-o_i)^2 \pmod p \in [0,T]$.

However, the modular proximity test is not equivalent to the proximity test. Accordingly, the modular proximity test should be safeguarded. In order to provide this safeguard, at 202, during enrollment the user also supplies an encryption of one or more random vectors, such as vector v of the same length, such that each element $v_i$ is drawn from the independent and identically distributed distribution unif{0,1}.

Embodiments may utilize an additional validity test 216 on t and v:

Validity test: $\Sigma t_i\ v_i \pmod p\, \varepsilon [-na,na]$

Lemma #1: If all elements oft are in the range [−a,a] then: (1) the modular proximity test and the proximity test are equivalent, and (2) the validity test will pass.

Proof: Since $t_i, o_i \in [-a,a]$, then $(t_i-o_i)^2 \in [0,4a^2]$. Therefore $\Sigma(t_i-o_i)^2 \in [0,4na^2]$. Since our p satisfies $p>n(2na+a)^2$, we conclude that $\Sigma(t_i-o_i)^2 \pmod p$ is equal to $\Sigma(t_i-o_i)^2$. This proves (1). Similarly, from $t_i \in [-a,a]$ and $v_i \in [0,1]$ we conclude $t_i\ v_i \pmod p \in [-na,na]$, which proves (2).

Lemma #2: If the proximity test fails and the modular proximity test passes, then the validity test has probability of at most 0.5 to pass.

Proof: Assuming that the proximity test fails, and the modular proximity test passes, then $\Sigma(t_i-o_i)^2>T$, but $\Sigma(t_i-o_i)^2 \pmod p \in [0,T]$. This can only be true if for some $k \ge 1$ it holds that: $kp \le \Sigma(t_i-o_i)^2 \le kp+T$. In particular, then: $\Sigma(t_i-o_i)^2 \ge p$. This implies that for some j it holds that $(t_j-o_j)^2 \ge p/n$, or $|t_i-o_i| \ge \sqrt{(p/n)}$. Since $o_i \in [-a,a]$, then $|t_j| \ge \sqrt{(p/n)}-a$. Since $p>n(2na+a)^2$ we get $|t_j|>2na$. Since $t_j \in (-p/2,p/2)$ is also a given, then $|t_j \pmod p|>2na$.

Now assume that all the elements $v_i$ of v are drawn, except $v_j$. then there are two possible options of $v_j=0$ and $v_j=1$. It may be denoted that $x_0=\Sigma_{(i \ne j)} t_i\ v_i \pmod p$, and $x_1=(t_j+\Sigma_{(i \ne j)} t_i\ v_i) \pmod p$. For example, $x_0$ and $x_1$ are two possible results of the inner product, one for the possibility $v_j=0$ and one for $v_j=1$. Then, the distance between $x_0$ and $x_1$ may be computed as: $d_p(x_1,x_0)=|(x_1-x_0)\pmod p|=|t_j \pmod p|>2na$. If the validity test passes for both $v_j=0$ and $v_j=1$, then $x_0, x_1 \in [-na,na]$. But this implies $d_p(x_0, x_1) \le 2na$, which is a contradiction. Hence, at most one of $v_j=0$ and $v_j=1$ can pass the validity test.

To increase security, the user may select multiple independent and identically distributed vectors $v^i$, i=1, . . . m, and for a given t perform m validity tests.

Lemma #3: If the proximity test fails and the modular proximity test passes, then m independent validity tests have the probability of at most $0.5^m$ to pass.

Proof: From lemma #2 it follows that for a given t, the probability of choosing a vector v that causes the validity test to pass is at most 0.5. Thus, the probability of choosing independent vectors $v^i$ for i=1 . . . m that make all validity tests pass is at most $0.5^m$.

Figure 3:
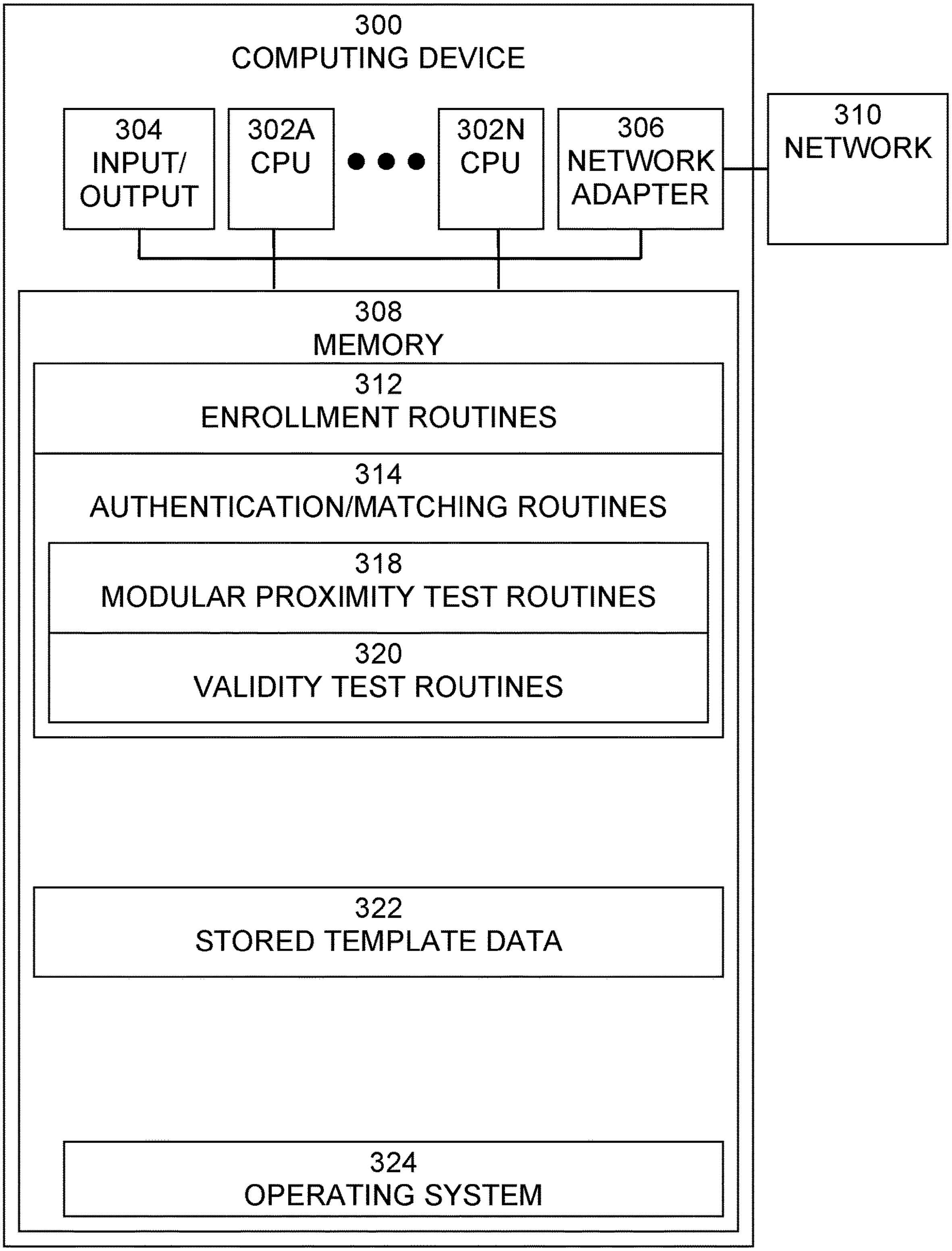
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include enrollment routines 312, authentication/matching routines 314, modular proximity test routines 318, and validity test routines 320, stored template data 322 and operating system 324. Enrollment routines 312 may include software routines to perform enrollment of one or more clients, as described above. Authentication/matching routines 314 may include software routines to perform authentication of a user by matching of authentication data of the user, such as biometric data, as described above. Authentication/matching routines 314 may include, which may include software routines to perform proximity testing on received authentication data, as described above. Authentication/matching routines 314 may include modular proximity test routines 318, which may include software routines to perform modular proximity testing on received authentication data, as described above. Authentication/matching routines 314 may include validity test routines 320, which may include software routines to perform validity testing on received authentication data, as described above. Stored template data 322 may include authentication data of clients, such as biometric data, to be authenticated and matched with authentication data received during the authentication process, as described above. Operating system 322 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of user enrollment and authentication processing, implemented in a computer system comprising a processor, memory accessible by the processor, and computer program instructions stored in the memory and executable by the processor, the method comprising:

receiving and storing enrollment information from a client computer system, the enrollment information comprising a template of authentication data and a plurality of additional vectors, wherein the template of authentication data is a vector representing values of features of biometric data, wherein the plurality of additional vectors are random 0-1 vectors, and wherein the template of authentication data is encrypted and the plurality of additional vectors are also encrypted;

receiving an additional template, wherein the additional template is also a vector representing values of features of biometric data and wherein the additional template is also encrypted, to be used to authenticate the user from the client computer system;

authenticating the user using the received additional template, the stored template, and the plurality of additional vectors; and determining that the authentication is successful when the received additional template matches the stored template by computing a distance function between the stored template and the received additional template using modular arithmetic and determining that they match when the computed distance is smaller than a pre-defined threshold;

selecting a number of the plurality of additional vectors based on a desired probability of detecting an invalid template; and determining that the received additional template is valid based on whether an inner product between the received additional template and each of the number of the plurality of additional vectors is confined to a range.

2. The method of claim 1, wherein the encryption is Homomorphic Encryption or Functional Encryption and the operations are performed on the vectors and templates using the properties of Homomorphic Encryption or Functional Encryption.

3. A system for user enrollment and authentication processing, the system comprising a processor, memory accessible by the processor, and computer program instructions stored in the memory and executable by the processor to perform:

receiving and storing enrollment information from a client computer system, the enrollment information comprising a template of authentication data and a plurality of additional vectors, wherein the template of authentication data is a vector representing values of features of biometric data, wherein the plurality of additional vectors are random 0-1 vectors, and wherein the template of authentication data is encrypted and the plurality of additional vectors are also encrypted;

receiving an additional template, wherein the additional template is also a vector representing values of features of biometric data and wherein the additional template is also encrypted, to be used to authenticate the user from the client computer system;

authenticating the user using the received additional template, the stored template, and the plurality of additional vectors; and determining that the authentication is successful when the received additional template matches the stored template by computing a distance function between the stored template and the received additional template using modular arithmetic and determining that they match when the computed distance is smaller than a pre-defined threshold;

selecting a number of the plurality of additional vectors based on a desired probability of detecting an invalid template; and determining that the received additional template is valid based on whether an inner product between the received additional template and each of the number of the plurality of additional vectors is confined to a range.

4. The system of claim 3, wherein the encryption is Homomorphic Encryption or Functional Encryption and the operations are performed on the vectors and templates using the properties of Homomorphic Encryption or Functional Encryption.

5. A computer program product for user enrollment and authentication processing, the computer program product comprising a non-transitory computer readable storage having program instructions embodied therewith, the program instructions executable by a computer, to cause the computer to perform a method comprising:

receiving and storing enrollment information from a client computer system, the enrollment information comprising a template of authentication data and a plurality of additional vectors, wherein the template of authentication data is a vector representing values of features of biometric data, wherein the plurality of additional vectors are random 0-1 vectors, and wherein the template of authentication data is encrypted and the plurality of additional vectors are also encrypted;

receiving an additional template, wherein the additional template is also a vector representing values of features of biometric data and wherein the additional template is also encrypted, to be used to authenticate the user from the client computer system;

authenticating the user using the received additional template, the stored template, and the plurality of additional vectors; and determining that the authentication is successful when the received additional template matches the stored template by computing a distance function between the stored template and the received additional template using modular arithmetic and determining that they match when the computed distance is smaller than a pre-defined threshold;

selecting a number of the plurality of additional vectors based on a desired probability of detecting an invalid template; and determining that the received additional template is valid based on whether an inner product between the received additional template and each of the number of the plurality of additional vectors is confined to a range.

6. The computer program product of claim 5, wherein the encryption is Homomorphic Encryption or Functional Encryption and the operations are performed on the vectors and templates using the properties of Homomorphic Encryption or Functional Encryption.

* * * * *